(12) United States Patent
Siddiqui et al.

(10) Patent No.: US 11,746,282 B2
(45) Date of Patent: *Sep. 5, 2023

(54) FRICTION REDUCERS, FRACTURING FLUID COMPOSITIONS AND USES THEREOF

(71) Applicant: Sunita Hydrocolloids Inc., Houston, TX (US)

(72) Inventors: Farhan Siddiqui, Katy, TX (US); Mohit Hissaria, Sugarland, TX (US); Danny Fred Wilson, Porter, TX (US); P K Hissaria, Jodhpur Rajasthan (IN)

(73) Assignee: Sunita Hydrocolloids Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,472

(22) Filed: Mar. 15, 2022

(65) Prior Publication Data

US 2022/0204836 A1 Jun. 30, 2022

Related U.S. Application Data

(63) Continuation-in-part of application No. 16/818,598, filed on Mar. 13, 2020, now Pat. No. 11,274,243, which is a continuation-in-part of application No. 16/004,176, filed on Jun. 8, 2018, now abandoned.

(51) Int. Cl.
*C09K 8/68* (2006.01)
*C09K 8/80* (2006.01)

(52) U.S. Cl.
CPC .............. *C09K 8/685* (2013.01); *C09K 8/80* (2013.01); *C09K 2208/24* (2013.01); *C09K 2208/26* (2013.01); *C09K 2208/28* (2013.01)

(58) Field of Classification Search
CPC ............ C09K 2208/24; C09K 2208/26; C09K 2208/28; C09K 8/685; C09K 8/80; C09K 8/887; C09K 8/90; C08B 37/0096; C08L 33/26; C08L 5/00
See application file for complete search history.

(56) References Cited

U.S. PATENT DOCUMENTS

| | | | |
|---|---|---|---|
| 3,871,691 | A | 3/1975 | Takagi et al. |
| 4,265,311 | A | 5/1981 | Ely |
| 4,425,241 | A | 1/1984 | Swanson |
| 4,688,639 | A | 8/1987 | Falk |
| 4,701,247 | A | 10/1987 | Kalonins et al. |

(Continued)

FOREIGN PATENT DOCUMENTS

| | | |
|---|---|---|
| WO | 2011012921 | 2/2011 |
| WO | 2014139037 | 9/2014 |

(Continued)

OTHER PUBLICATIONS

International Search Report and Written Opinion for corresponding PCT Application No. PCT/US2019/035985 dated Aug. 16, 2019.

*Primary Examiner* — Frances Tischler

(57) ABSTRACT

Friction reducers, fracturing fluid compositions and methods for treating subterranean formations, wherein friction reducer is a reacted, grafted or blend of natural gum and polyacrylamide having a molecular weight between 300,000 and 30,000,000.

20 Claims, 7 Drawing Sheets
(7 of 7 Drawing Sheet(s) Filed in Color)

(56) References Cited

U.S. PATENT DOCUMENTS

| | | |
|---|---|---|
| 5,100,932 A | 3/1992 | Lockhart et al. |
| 5,129,457 A | 7/1992 | Sydansk |
| 5,133,624 A | 7/1992 | Cahill |
| 5,220,938 A | 6/1993 | Kley |
| 5,669,456 A | 9/1997 | Auibert et al. |
| 5,720,347 A | 2/1998 | Audibert et al. |
| 5,789,349 A | 8/1998 | Patel |
| 5,881,825 A | 3/1999 | Collee et al. |
| 6,230,805 B1 | 5/2001 | Vercaemer et al. |
| 6,257,336 B1 | 7/2001 | Audibert et al. |
| 6,281,172 B1 | 8/2001 | Warren et al. |
| 6,309,455 B1 | 10/2001 | Skaggs et al. |
| 6,605,570 B2 | 8/2003 | Miller et al. |
| 6,720,290 B2 | 4/2004 | England et al. |
| 6,793,018 B2 | 9/2004 | Dawson et al. |
| 6,794,340 B2 | 9/2004 | Nguyen et al. |
| 6,818,596 B1 | 11/2004 | Hayes |
| 6,823,939 B2 | 11/2004 | Bouwmeester et al. |
| 6,825,152 B2 | 11/2004 | Green |
| 6,843,841 B2 | 1/2005 | Reddy et al. |
| 7,007,754 B2 | 3/2006 | Fanguy et al. |
| 7,131,493 B2 | 11/2006 | Eoff et al. |
| 7,261,158 B2 | 8/2007 | Middaugh et al. |
| 7,264,054 B2 | 9/2007 | Harris et al. |
| 7,271,133 B2 | 9/2007 | Weaver et al. |
| 7,275,596 B2 | 10/2007 | Willberg et al. |
| 7,304,098 B2 | 12/2007 | Li et al. |
| 7,373,977 B1 | 5/2008 | Berger et al. |
| 7,384,892 B2 | 6/2008 | Melbouci et al. |
| 7,407,915 B2 | 8/2008 | Jones et al. |
| 7,541,316 B2 | 6/2009 | Maresh |
| 7,549,474 B2 | 6/2009 | Valenziano et al. |
| 7,578,968 B1 | 8/2009 | Nalepa et al. |
| 7,622,427 B2 | 11/2009 | Sau et al. |
| 7,637,320 B2 | 12/2009 | Howard et al. |
| 7,687,438 B2 | 3/2010 | Munoz et al. |
| 7,694,739 B2 | 4/2010 | Brothers et al. |
| 7,703,521 B2 | 4/2010 | Sullivan et al. |
| 7,784,544 B2 | 8/2010 | Lindvig et al. |
| 7,798,224 B2 | 9/2010 | Huang et al. |
| 7,814,980 B2 | 10/2010 | Bryant et al. |
| 7,857,055 B2 | 12/2010 | Li |
| 8,043,999 B2 | 10/2011 | Sullivan et al. |
| 8,076,270 B2 | 12/2011 | Smith et al. |
| 8,196,660 B2 | 6/2012 | Smith |
| 8,338,341 B2 | 12/2012 | Ezzelarab et al. |
| 8,360,149 B2 | 1/2013 | Hughes et al. |
| 8,360,152 B2 | 1/2013 | Defosse et al. |
| 8,413,719 B2 | 4/2013 | Milne et al. |
| 8,720,556 B2 | 5/2014 | Todd |
| 8,722,588 B2 | 5/2014 | Zamudio et al. |
| 8,789,592 B2 | 7/2014 | Mason |
| 8,946,132 B2 | 2/2015 | Chang et al. |
| 9,034,802 B2 | 5/2015 | Ahrenst et al. |
| 9,062,242 B2 | 6/2015 | Jiang et al. |
| 9,296,943 B2 | 3/2016 | Ladva et al. |
| 9,399,729 B2 | 7/2016 | Singh et al. |
| 9,574,127 B2 | 2/2017 | Chapman |
| 9,574,131 B2 | 2/2017 | Weaver et al. |
| 9,598,629 B2 | 3/2017 | Morvan et al. |
| 9,650,299 B2 | 5/2017 | Alwattari et al. |
| 9,663,707 B2 | 5/2017 | Gupta et al. |
| 9,714,389 B2 | 7/2017 | See et al. |
| 9,790,777 B2 | 10/2017 | Nguyen et al. |
| 9,890,319 B2 | 2/2018 | Ezell et al. |
| 2004/0209780 A1 | 10/2004 | Harris et al. |
| 2005/0194142 A1 | 9/2005 | Nguyen et al. |
| 2005/0227874 A1 | 10/2005 | Berger et al. |
| 2006/0272816 A1 | 12/2006 | Willberg et al. |
| 2008/0312108 A1 | 12/2008 | Berger |
| 2009/0145607 A1* | 6/2009 | Li .................. C09K 8/685 166/308.5 |
| 2010/0184630 A1 | 7/2010 | Sullivan et al. |
| 2010/0184631 A1 | 7/2010 | Turner et al. |
| 2011/0265997 A1 | 11/2011 | Miquilena |
| 2012/0152544 A1 | 6/2012 | Parris et al. |
| 2012/0157356 A1 | 6/2012 | Dawson et al. |
| 2012/0252707 A1 | 10/2012 | Li et al. |
| 2013/0015115 A1 | 1/2013 | Landis et al. |
| 2013/0015141 A1 | 1/2013 | Landis et al. |
| 2013/0233546 A1 | 9/2013 | Liang et al. |
| 2013/0306321 A1 | 11/2013 | Lanctot-Downs et al. |
| 2014/0041944 A1 | 2/2014 | Ewanek |
| 2014/0262275 A1 | 9/2014 | Dean et al. |
| 2014/0305651 A1 | 10/2014 | Hill et al. |
| 2014/0352961 A1 | 12/2014 | Dobson et al. |
| 2015/0034315 A1 | 2/2015 | Jiang et al. |
| 2015/0057196 A1 | 2/2015 | Debord et al. |
| 2015/0060062 A1 | 3/2015 | Shen et al. |
| 2015/0166870 A1 | 6/2015 | Jain |
| 2015/0175877 A1 | 6/2015 | Shindgikar et al. |
| 2015/0252252 A1 | 9/2015 | Soane et al. |
| 2015/0252254 A1 | 9/2015 | Zhang et al. |
| 2015/0275068 A1 | 10/2015 | Shong et al. |
| 2015/0289530 A1 | 10/2015 | Demazeau et al. |
| 2015/0307772 A1 | 10/2015 | Zhang et al. |
| 2016/0009985 A1 | 1/2016 | Brennan et al. |
| 2016/0137906 A1 | 5/2016 | Guan et al. |
| 2016/0160118 A1 | 6/2016 | Van Oort et al. |
| 2016/0177166 A1 | 6/2016 | Reddy et al. |
| 2016/0264850 A1 | 9/2016 | Okunola et al. |
| 2016/0298018 A1 | 10/2016 | Medvedev et al. |
| 2016/0298022 A1 | 10/2016 | Chang |
| 2016/0347986 A1 | 12/2016 | Nguyen et al. |
| 2016/0355726 A1 | 12/2016 | Eoff et al. |
| 2016/0376881 A1 | 12/2016 | Li et al. |
| 2017/0015893 A1 | 1/2017 | Al-Yousef et al. |
| 2017/0044418 A1 | 2/2017 | Lee et al. |
| 2017/0088769 A1 | 3/2017 | Kesavan et al. |
| 2017/0088770 A1 | 3/2017 | Kramer |
| 2017/0137702 A1 | 5/2017 | Khlestkin et al. |
| 2017/0145302 A1 | 5/2017 | Qin et al. |
| 2017/0198202 A1 | 7/2017 | Shong et al. |
| 2017/0313931 A1 | 11/2017 | Chopade et al. |
| 2017/0349817 A1 | 12/2017 | Maberry et al. |
| 2017/0369767 A1 | 12/2017 | Guo et al. |
| 2018/0112124 A1 | 4/2018 | Conner et al. |
| 2018/0118992 A1 | 5/2018 | May |
| 2019/0161673 A1 | 5/2019 | McDaniel et al. |

FOREIGN PATENT DOCUMENTS

| | | |
|---|---|---|
| WO | 2015080609 | 6/2015 |
| WO | 2015/108929 A2 | 7/2015 |
| WO | 2016088141 | 6/2016 |
| WO | 2016195525 | 12/2016 |
| WO | 2016201445 A1 | 12/2016 |
| WO | 2017044953 | 3/2017 |
| WO | 2017069762 | 4/2017 |
| WO | 2017131525 | 8/2017 |
| WO | 2017184111 | 10/2017 |
| WO | 2018/145065 A1 | 8/2018 |

* cited by examiner

FRICTION REDUCERS, FRACTURING FLUID COMPOSITIONS AND USES THEREOF

FIELD OF THE INVENTION

The invention relates to friction reducer fluid compositions and methods for treating subterranean formations.

BACKGROUND OF THE INVENTION

Galactomannan gums have many industrial and nonindustrial uses, such as the use in oil and gas fields as part of fracturing fluid and as a crosslinkable polymer to carry proppants, and in food and beverages as a thickener, stabilizer, suspension and binding agent, and in explosives. Similarly, polyacrylamides also have various uses such as water treatment, flocculants, absorbents, thickening agents, oil and gas fields for secondary oil recovery and as a proppant carrier and friction reducer.

In oil well operations, a fracturing fluid is pumped into the well bore under high pressure to fracture the rock formations surrounding it. The pressure is then relieved, allowing the oil to seep through the fractures into the well bore where it is pumped to the surface. It is desirable to have the thickening agent degrade because degradation should decrease the viscosity to near the levels it would be at without the thickening agent. This is desirable because, when the viscosity of the fracturing fluid is high, oil will not flow easily into the fractures of the formation and will remain in the fissured spaces. A good thickening agent, therefore, yields a high viscosity at a low concentration, reduces friction pressure, is inexpensive, and degrades once it has carried the sand particles into the fractures. Preferably, it should also not leave insoluble precipitates or residues when it is degraded, as these precipitates or residues tend to plug the formations. The amount of oil which can be obtained from a well depends to a great extent upon how extensively the rock formations can be fractured. This, in turn, depends upon the degree of pressure that is applied to the rock. Due to friction between the fracturing fluid and the pipe or rock and within the fracturing fluid itself because of turbulent flow, a significant amount of energy may be lost as the fluid travels from the earth's surface to the formation, and considerably less pressure may be actually applied to the rock than was originally applied at the top of the well. This problem is minimized by adding a friction reducer to the fracturing fluid.

A good friction reducer should cause a large decrease in friction when used in small concentrations, be inexpensive, have shear, temperature and pressure stability, work at all or most total dissolved solids (TDS) and not leave deposits which plug the formation.

There remains a need in the art for good friction reducers that would satisfy these characteristics and for fracturing fluid compositions containing these friction reducers.

SUMMARY OF THE INVENTION

In one embodiment, the invention provides a friction reducer comprising a reacted product of natural gum and partially hydrolyzed polyacrylamide (PHPA) having a molecular weight between 300,000 and 30,000,000, wherein the PHPA and/or natural gum has an average particle size of 150 µm or less.

In one embodiment, the invention provides a friction reducer comprising of partially hydrolyzed polyacrylamide (PHPA) grafted on natural gum having a molecular weight between 300,000 and 30,000,000, wherein the PHPA and/or natural gum has an average particle size of 150 µm or less.

In one embodiment, the invention provides a friction reducer comprising a blend of natural gum and partially hydrolyzed polyacrylamide (PHPA) having a molecular weight between 300,000 and 30,000,000, wherein the PHPA and/or natural gum has an average particle size of 150 µm or less.

In one embodiment, the ratio of natural gum and PHPA or other natural gum is from about 3:1 to 5:1 to about 1:0.01 by weight of the friction reducer.

In one embodiment, the natural gum is a galactomannan gum.

In one embodiment, the galactomannan gum is guar gum.

In one embodiment, the guar gum is derivatized.

In one preferred embodiment, the friction reducer comprises a locust bean gum.

In another preferred embodiment, the friction reducer comprises a karaya gum.

In another preferred embodiment, the friction reducer comprises a cassia tora gum.

In one embodiment, the friction reducer comprises a cellulose polymer.

In one embodiment, the friction reducer comprises a starch polymer.

In another embodiment, the friction reducer comprises a combination of two or more ingredients selected from guar gum, guar gum derivatives, locust bean gum, karaya gum, cassia tora, carrageenan gum, xanthan gum, starch, cellulose or any natural gum.

In another embodiment, the friction reducer comprises copolymers of acrylamides.

In another embodiment, the friction reducer comprises acrylic acids.

In another embodiment, the friction reducer comprises acrylic acids salts.

In another embodiment, the friction reducer comprises a combination of PHPA, copolymers of acrylamides, acrylic acid and its salts.

In one embodiment, the friction reducer can be prepared by reacting a natural gum, either a guar gum or another gum or a combination of gums with a PHPA, either a copolymer of acrylamides or acrylic acids and its salts.

In one embodiment, the friction reducer can be prepared by grafting PHPA either a copolymer of acrylamides or acrylic acids and its salts, on a natural gum, either a guar gum or another gum or a combination of gums.

In one embodiment, the friction reducer can be prepared by combining a natural gum, either a guar gum or another gum or a combination of gums and a PHPA, either a copolymer of acrylamides or acrylic acids and its salts.

The invention is particularly suited for slick water fracturing applications, wherein a low viscosity aqueous fluid is pumped into subterranean formations to induce the subterranean fractures. The hydrated polymer suppresses the turbulence present in high velocity gradient water.

In one embodiment, the invention provides a fracturing fluid comprising: an aqueous base fluid, a dry blend or a liquid slurry; a friction reducer, wherein the friction reducer is either a reacted compound of natural gum and PHPA or a grafted PHPA on a natural gum or a blend of natural gum and PHPA having a molecular weight between 300,000 and 30,000,000 wherein the PHPA and/or natural gum has an average particle size of 150 µm or less.

In one embodiment, the concentration of the friction reducer in the fracturing fluid is from about 0.2% to about 0.5% and more preferably from about 0.1% to about 0.2% by weight of the fracturing fluid.

In one embodiment, the concentration of the PHPA in the fracturing fluid is from about 0.02% to about 0.05% by weight of the fracturing fluid.

In one embodiment, the fracturing fluid of the invention has a viscosity of from 1 cp to 10 cps; and more preferably from 2 cps to 4 cps.

In one embodiment, the fracturing fluid of the invention has a viscosity of from 50 cps to 500 cps; and more preferably from 50 cps to 250 cps when crosslinked.

In one embodiment, the temperature of the fracturing fluid of the invention is less than 150° C., preferably 120° C. or less, and even more preferably 100° C. or less.

In one embodiment, the temperature of the fracturing fluid of the invention is less than 120° C.

In one embodiment, the concentration of the friction reducer is about 0.1% or less by weight of the fracturing fluid.

In another embodiment, fresh water comprises 95% or more, preferably, 97% or more, and even more preferably 99% or more by weight of the aqueous base fluid.

In one embodiment, the aqueous base fluid is a fresh water or brine or flowback water or a combination of water sources.

Brine comprising one or more dissolved inorganic salts in a total concentration between 0.1 and 20 weight percent of the total weight of the aqueous base fluid.

In another embodiment, the inorganic salt comprises one or more monovalent or divalent or trivalent cations.

In another embodiment, the trivalent cations comprise iron cations.

In another embodiment, the trivalent cations comprise boron cations.

In another preferred embodiment, the trivalent cations comprise both iron and boron cations.

In another embodiment, the divalent cations comprise calcium cations.

In another embodiment, the divalent cations comprise iron cations.

In another embodiment, the divalent cations comprise strontium cations.

In one preferred embodiment, the divalent cations comprise magnesium cations.

In another preferred embodiment, the divalent cations comprise of calcium, iron, strontium and magnesium cations.

In one preferred embodiment, the monovalent cations comprise sodium cations.

In another preferred embodiment, the monovalent cations comprise potassium cations.

In another preferred embodiment, the monovalent cations comprise both sodium and potassium cations.

In another embodiment, the inorganic salt comprises one or more monovalent or divalent anions.

In another embodiment, the divalent anions comprise sulfates.

In another embodiment, the divalent anions comprise sulfides.

In another embodiment, the divalent anions comprise oxides.

In another embodiment, the divalent anions comprise carbonates.

In another preferred embodiment, the divalent anions comprise of sulfates, sulfides, carbonates and oxides.

In one preferred embodiment, the monovalent anions comprise of chlorides.

In another preferred embodiment, the monovalent anions comprise of bicarbonates.

In another preferred embodiment, the monovalent anions comprise both of chlorides and bicarbonates anions.

In one embodiment, at least a portion of the aqueous base fluid is flowback water.

In another embodiment, the aqueous base fluid comprises fresh fracturing fluid, recycled fracturing fluid, flowback fracturing fluid or back-produced fracturing fluid, or combinations thereof.

In one embodiment, the friction reducer can act as hybrid fracturing fluid and eliminate the need to use two products for different stages of fracturing.

In one embodiment, the friction reducer can also be used for carrying proppants from 20 mesh to 100 mesh.

In one embodiment, the friction reducer can also be crosslinked with boron and other group 4 metals likes zirconium, titanium and hafnium.

In another embodiment, the friction reducer can be used without any additional crosslinkers. Thus, in one embodiment, the fracturing fluid of the invention does not include any additional cross-linker (because there is no need to use other cross-linkers due to the advantages of the provided synergistic compound).

In one embodiment, the friction reducer is biodegradable.

In one embodiment, the friction reducer is breakable into small particles with strong oxidizers.

In one embodiment, the friction reducer is breakable into small particles with enzymes.

In one embodiment, the friction reducer is an iron control friction reducer.

In one embodiment, the residual total organic nitrogen in the friction reducer is below 7%.

In one embodiment, regain permeability of the friction reducer is above 80%.

In one embodiment, the friction reducer does not block the screen with iron present.

In one embodiment, the friction reducer is slurriable in mineral oil and other non-sheen forming oils and solvents.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
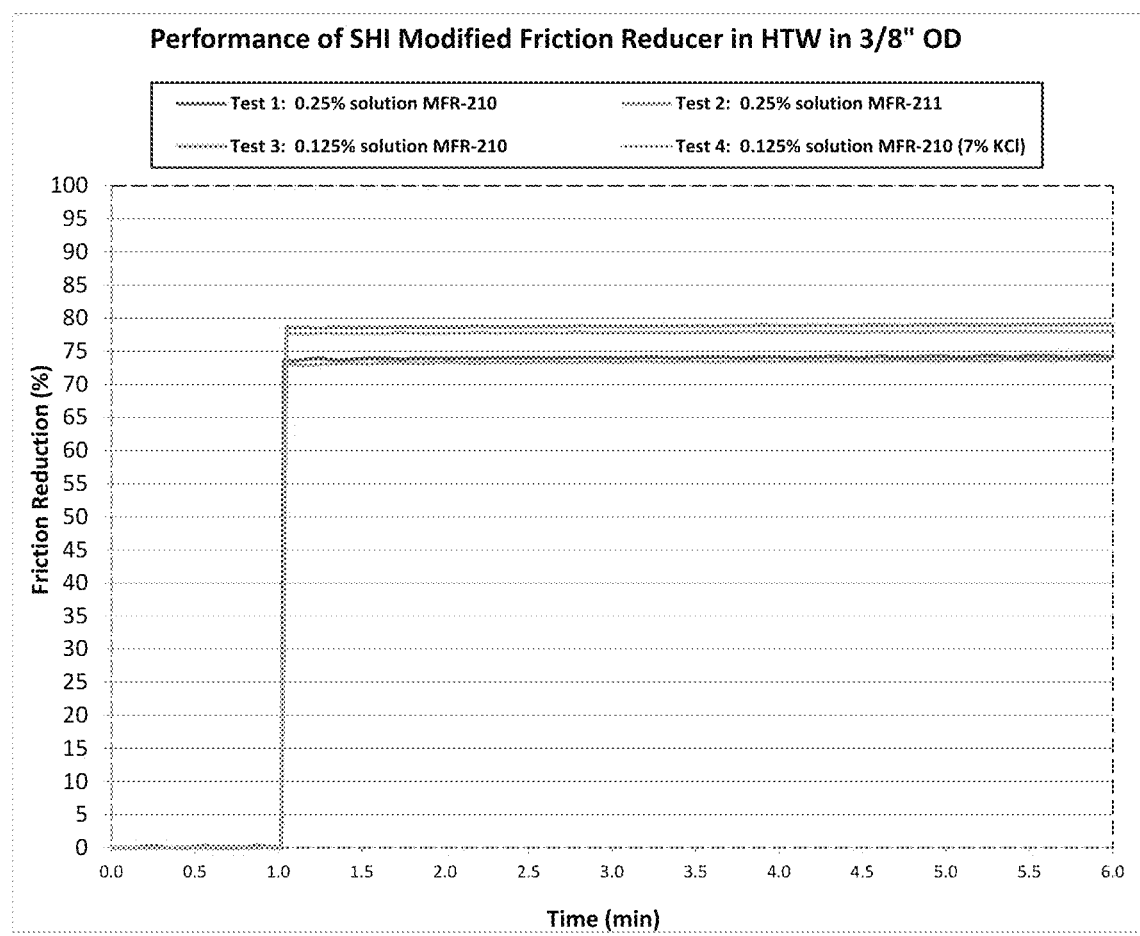
FIG. 1 is a graph demonstrating friction reduction performance of various modified friction reducer (MFR) in Houston Tap Water (HTW) and 7% (KCl).

The invention is directed to a surprising and unexpected discovery that a reacted, grafted or blended mixture of natural gums and polyacrylamide having a molecular weight between 300,000 and 30,000,000 can serve as an effective friction reducer at a very low concentration of less than 0.1% by weight (when this blend is used in a combination with an aqueous base fluid, a dry blend, or a liquid slurry) or as a thickening agent when used at higher concentrations of greater than 0.2% by weight, wherein "by weight' refers to the total weight of the aqueous base fluid, dry blend or liquid slurry.

The polyacrylamides currently used as friction reducers are essentially linear homopolymers. In contrast, the synergetic blend of the present invention is a reacted compound or mixture of mainly a natural gum (a carbohydrate with soluble fiber) with small amounts of (1-20% and preferably 1-10% and more preferably 1-5% by total weight of the friction reducer) partially hydrolyzed polyacrylamides (PHPAs). One of the key advantages of the friction reducers of the present invention is that when they are utilized as friction reducers, they provide more viscous aqueous solutions than conventional friction reducers while maintaining the friction reducing properties. Therefore, the synergetic compounds of the present invention are more economically utilizable as friction reducers than conventional linear galactomannans and homo polyacrylamides because they provide the desired solution properties at lower concentrations, such as 0.1% or less by weight of the fracturing fluid.

The synergistic compounds of the present invention effectively reduce friction in all Total Dissolved Solids (TDS) brines. Utilizing friction reducers of the present invention allows to avoid the need for separate friction reducers for fresh water, mid brine, high brine, cationic liquid friction reducer, or high viscosity liquid friction reducer.

At higher concentrations of greater than 0.2% by weight of the fracturing fluid, this blend is effective as a thickening agent. The synergistic blend of the present invention has improved shear and temperature stability, is easily degradable, and does not leave any insoluble residues when degraded.

The term "natural gum" refers to polysaccharides of natural origin, capable of causing a large increase in a solution's viscosity, even at small concentrations. This term includes, but is not limited to, galactomannan gums.

In one embodiment, the invention provides a friction reducer comprising a reacted, a grafted or a blend of natural gum and partially hydrolyzed polyacrylamide (PHPA) having a molecular weight between 300,000 and 30,000,000, wherein the PHPA and/or natural gum has an average particle size of 150 μm or less.

In one embodiment, the ratio of natural gum and PHPA is from about 5-1 to about 1:0.01 by weight of the fraction reducer.

In one embodiment, the natural gum is a galactomannan gum.

In one embodiment, the galactomannan gum is guar gum.

In one preferred embodiment, the friction reducer comprises a locust bean gum.

In another preferred embodiment, the friction reducer comprises a karaya gum.

In another preferred embodiment, the friction reducer comprises a cassia tora gum.

In one embodiment, the friction reducer comprises a cellulose polymer.

In one embodiment, the friction reducer comprises a starch polymer.

In another embodiment, the friction reducer comprises a combination of two or more ingredients selected from guar gum, guar gum derivatives, locust bean gum, karaya gum, cassia tora, carrageenan gum, xanthan gum, starch, cellulose or any natural gum.

In another embodiment, the friction reducer comprises copolymers of acrylamides.

In another embodiment, the friction reducer comprises acrylic acids.

In another embodiment, the friction reducer comprises acrylic acids salts.

In another embodiment, the friction reducer comprises a combination of PHPA, copolymers of acrylamides, acrylic acid and its salts.

In one embodiment, the friction reducer can be prepared by combining a natural gum and a PHPA. The combination can be a reacted product, or a grafted polymer or a simple blend.

The invention is particularly suited for slick water fracturing applications, wherein a low viscosity aqueous fluid is pumped into subterranean formations to induce the subterranean fractures. The hydrated polymer suppresses the turbulence present in high velocity gradient water.

In one embodiment, the invention provides a fracturing fluid comprising: an aqueous base fluid, a dry blend or a liquid slurry; a friction reducer, wherein the friction reducer is a reacted blend of natural gum and PHPA having a molecular weight between 300,000 and 30,000,000 wherein the PHPA and/or natural gum has an average particle size of 150 μm or less.

In one embodiment, the concentration of the friction reducer in the fracturing fluid is from about 0.1% to about 0.5% and more preferably from about 0.1% to about 0.2% by weight of the fracturing fluid.

In one embodiment, the concentration of the PHPA in the fracturing fluid is from about 0.02% to about 0.05% by weight of the fracturing fluid.

In one embodiment, the fracturing fluid of the invention has a viscosity of from 1 cp to 10 cps; and more preferably from 2 cps to 4 cps.

In one embodiment, the temperature of the fracturing fluid of the invention is less than 150° C., preferably 120° C. or less and even more preferably 100° C. or less.

In one embodiment, the concentration of the friction reducer is about 0.1% or less by weight of the fracturing fluid.

In another embodiment, fresh water comprises 95% or more, preferably, 97% or more, and even more preferably 99% or more by weight of the aqueous base fluid.

In one embodiment, the aqueous base fluid is a brine comprising one or more dissolved inorganic salts in a total concentration between 0.1 and 20 weight percent of the total weight of the aqueous base fluid.

In another embodiment, the inorganic salt comprises one or more monovalent or divalent or trivalent cations and monovalent and divalent anions.

In another embodiment, the trivalent cations comprise iron cations.

In another embodiment, the trivalent cations comprise boron cations.

In another preferred embodiment, the trivalent cations comprise both iron and boron cations.

In another embodiment, the divalent cations comprise calcium and iron cations.

In one preferred embodiment, the divalent cations comprise magnesium and strontium cations.

In another preferred embodiment, the divalent cations comprise both calcium, iron, strontium and magnesium cations.

In one preferred embodiment, the monovalent cations comprise sodium cations.

In another preferred embodiment, the monovalent cations comprise potassium cations.

In another preferred embodiment, the monovalent cations comprise both sodium and potassium cations.

In another embodiment, the divalent anions comprise of sulfates, sulfides and oxides.

In another preferred embodiment, the monovalent anions comprise of chlorides and bicarbonates.

In one embodiment, at least a portion of the aqueous base fluid is flowback water.

In another embodiment, the aqueous base fluid comprises fresh fracturing fluid recycled fracturing fluid, flowback fracturing fluid or back-produced fracturing fluid, or combinations thereof.

In one embodiment, the friction reducer can act as hybrid fracturing fluid and eliminate the need to use two products for different stages of fracturing.

In one embodiment the friction reducer can be used as iron control. It doesn't block the screen when iron is present in produced water.

In one embodiment, the friction reducer can also be used for carrying proppants from 20 mesh to 100 mesh.

In one embodiment, the friction reducer can also be crosslinked with boron and other group 4 metals likes zirconium, titanium and hafnium.

In another embodiment, the friction reducer of the invention can be used without any additional crosslinkers. Thus, in one embodiment, the fracturing fluid of the invention does not include any additional cross-linker (because there is no need to use other cross-linkers due to the advantages of the provided synergistic blend and because viscosity of the fracturing fluid does not need to be high for slick water applications).

In one embodiment, the friction reducer is biodegradable.

In one embodiment, the friction reducer is breakable with strong oxidizers.

In one embodiment, the friction reducer is breakable into small particles with enzymes.

In one embodiment, the friction reducer is an iron control friction reducer.

In one embodiment, the residual total organic nitrogen in the friction reducer is below 7%.

In one embodiment, regain permeability of the friction reducer is above 80%.

In one embodiment, the friction reducer is slurriable in mineral oil and other non-sheen forming oils and solvents.

Hydraulic fracturing is an unconventional drilling method used due to increasing scarcity of retrieving oil and gas using conventional methods. It allows to drill down, drill horizontally and fracturing happens, which enables oil and gas to be flowing from tight reservoirs. The general practice for treatments of reservoirs applies a sequence of pumping events where millions of gallons of water based fracturing fluids mixed with proppants and other chemicals are pumped in a controlled environment above fracture pressure. Proppants such as sand or ceramic beads are usually added to hold the fractures open after treatment is complete. The chemical additives typically account for only 0.5%-2% of the total fluid, the rest is water. The chemical additives include, but are not limited to, thickening agents, such as friction reducers, guar gum and its derivatives, crosslinkers, scale inhibitors, corrosion inhibitors, biocides, surfactants, acids, oxygen scavengers, breakers and clay control.

The main fluids currently used for fracturing are water-based friction reducing additives called slick water. This allows the fracturing additives to be pumped to the target zone at reduced pressure and higher rate. However, the choice of additives varies with water quality source, site specific needs of the target formation and including company preferences along with the design engineer.

The fracturing fluid of the invention may also contain other conventional additives common to the well service industry, including but not limited to, corrosion inhibitors, surfactants, demulsifying agents, scale inhibitors, asphaltene inhibitors, paraffin inhibitors, gas hydrate inhibitors, dispersants, oxygen scavengers, biocides and the like.

Suitable surfactants may act as surface active agents and function as emulsifiers, dispersants, foamers or defoamers. In some embodiments of the invention, the surfactant is an anionic surfactant. Examples of suitable anionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates.

Examples of common additives that could be present in the friction reducers and/or fracturing fluids of the present invention, as well as a more detailed explanation how friction reducers and/or fracturing fluids may work can be found, for example, in U.S. Pat. No. 7,857,055 (Li), U.S. Patent Application Publication No. 2012/0157356, the contents of which are herein incorporated by reference in their entirety.

The following are some of the examples of the friction reducer melds of the invention:

FR: anionic PHPA: 100% by weight of the total composition.

MFR-210: fast hydrating guar gum reacted or grafted or blended with anionic PHPA or PAM.

MFR-211: premium guar gum reacted or grafted or blended with anionic PHPA or PAM.

MFR-212: CMHPG: reacted or grafted or blended with anionic PHPA or PAM.

Hyslic 9901: has higher fraction (15-40%) of Acrylic Acid, PAM or PHPA grafted, reacted, or combined with guar gum while maintaining the salt tolerance and its ability to breakdown with enzymes.

Hyslic 3000: is a grafted, reacted or combined product of two or more natural gums.

Molecular weight of anionic PHPA was between 10,000,000 and 30,000,000. All tested anionic PHPAs worked for the purposes of the invention.

Hereinafter, the present invention will be further illustrated with reference to the following examples. However, these examples are only provided for illustrative purposes, and are not meant to limit the scope of the present invention.

EXAMPLES

The following is a list of abbreviations used throughout these Examples and the rest of the specification:

| Additives | |
|---|---|
| cps | Centipoise |
| GG | Guar Gum |
| RT | Room Temperature |
| HPG | Hydroxy Propyl Guar |
| CMHPG | Carboxy Methyl Hydroxy Propyl Guar |
| SHI-057PB | Anionic PHPA Dry (FR) |
| HTW | Houston Tap Water |
| DIW | Deionized Water |
| KCl | Potassium Chloride |
| PAM | Polyacrylamide |
| PHPA | Partially Hydrolyzed Polyacrylamide |
| MFR-210 | Modified Friction Reducer Fast hydrating |
| MFR-211 | Modified Friction Reducer Premium |
| MFR-212 | Modified Friction Reducer Derivatized |

Example 1

Preparation of Natural Gum/Polyacrylamide Blends

To a 500 ml WARING blender jar 250 ml DIW was added and 1.2 gms of either guar gum or a friction reducer or a modified friction reducer for 0.5% solution and 0.6 gms for 0.25% solution was slowly added and mixed at 1100 rpm on Grace M3080 variable speed mixer for 2.5 minutes at room temperature.

Hydration viscosities in centipoise (cps) were compared between regular guar gum and regular anionic PHPA and between modified friction reducer. Hydration viscosities were measured on Grace 3600, at 3 minutes and 60 minutes. It was used as a stand-alone unit without the use of external equipment, as described in U.S. Pat. No. 6,571,609, the contents of which are hereby incorporated by reference in their entirety. The results are shown in Table 1 below, which shows that the polysaccharide blend with anionic PHPA produced higher hydration viscosities than regular guar gum or regular anionic PHPA. At the end of the experiment, pH was also measured.

TABLE 1

| | Viscosity (cps) | | | | | |
|---|---|---|---|---|---|---|
| Hydration Time (min) | MFR-211 0.5% | MFR-211 0.25% | FR 0.5% | FR 0.25% | Guar Gum 0.5% | Guar Gum 0.25% |
| 3 | 43 | 16 | 20 | 11 | 39 | 12 |
| 30 | 52 | 20 | 45 | 17 | 44 | 14 |
| pH | 7.6 | 7.73 | 7.72 | 7.78 | 7.61 | 7.69 |

To test further concentrations, additional blends were prepared as follows. To a 500 ml WARING blender jar 250 ml DIW was added and guar gum or modified friction reducer blend, 0.6 gms for 0.25% solution and 0.3 gms for 0.125% solution and 0.15 gms for 0.0625% solution was slowly added and mixed at 1100 rpm on Grace M3080 variable speed mixer for 2.5 minutes at room temperature. Hydration viscosities were measured on Grace 3600, at 3 minutes and 60 minutes.

Hydration viscosities in centipoise (cps) were compared between guar gum and derivatized guar gum and between mixtures of guar gum and polyacrylamides. From 90.1% guar gum and 9.9% anionic polyacrylamide mixture was blended and compared. These samples were sent to a third-party lab to run friction loop test.

The results of the test are shown in Table 2 and 3 below.

TABLE 2

| | Viscosity (cps) | | | | | |
|---|---|---|---|---|---|---|
| Hydration time (min) | GG 0.063% | GG 0.13% | GG 0.25% | MFR-210 0.06% | MFR-210 0.13% | MFR-210 0.25% |
| 3 | 2.1 | 3.9 | 12.4 | 3.2 | 6.7 | 15 |
| 30 | 2.3 | 4.7 | 14.5 | 3.5 | 8.2 | 16.5 |

TABLE 3

| | Viscosity (cps) | | | | |
|---|---|---|---|---|---|
| Hydration time (min) | CMHPG 0.063% | CMHPG 0.13% | CMHPG 0.25% | MFR-212 0.06% | MFR-212 0.13% |
| 3 | 2.9 | 6 | 11.5 | 4.3 | 9.2 |
| 30 | 3.9 | 6 | 13.3 | 4.7 | 9.2 |

The results shown in Table 2 and 3 indicate that the current inventive compound MFR-210 and MFR-212 has higher viscosity than regular guar gum or CMHPG for the same concentration and same temperature.

To test whether there are variations based on a supplier of PHPA, we ran tests using different versions of PHPA received from different suppliers, referred to as FR-1; FR-2 and FR-3. FR-1, FR-2 and FR-3 are all PHPAs.

To a 500 ml WARING blender jar 250 ml DIW was added and guar gum and anionic PHPA from different vendors were blended for 0.25%, 0.125% and 0.0625% solutions and mixed at 1100 rpm on Grace M3080 variable speed mixer at 1100 rpm for 2.5 minutes. Hydration viscosities were measured on Grace 3600, at 3 minutes and 60 minutes.

The results of the tests are shown in Tables 4-6 below. Each of Tables 4-6 contains data for a different version of PHPA.

TABLE 4

| | Viscosity (cps) | | | | | |
|---|---|---|---|---|---|---|
| Hydration time (min) | GG 0.63% | GG 0.13% | GG 0.25% | MFR-210 0.06% | MFR-210 0.13% | MFR-210 0.25% |
| 3 | 1.9 | 3.7 | 8.9 | 2.5 | 4.9 | 11.9 |
| 30 | 2 | 4.5 | 11.1 | 3 | 6.4 | 14.2 |

TABLE 5

| Hydration time (min) | Viscosity (cps) | | | | | |
|---|---|---|---|---|---|---|
| | GG 0.63% | GG 0.13% | GG 0.25% | FR2 MFR-210 0.06% | FR2 MFR-210 0.13% | FR2 MFR-210 0.25% |
| 3 | 1.9 | 3.7 | 8.9 | 2.9 | 5.6 | 15.5 |
| 30 | 2 | 4.5 | 11.1 | 3.1 | 7 | 18.8 |

TABLE 6

| Hydration time (min) | Viscosity (cps) | | | | | |
|---|---|---|---|---|---|---|
| | GG 0.63% | GG 0.13% | GG 0.25% | FR3 MFR-210 0.06% | FR3 MFR-210 0.13% | FR3 MFR-210 0.25% |
| 3 | 1.9 | 3.7 | 8.9 | 2.9 | 5.8 | 17.2 |
| 30 | 2 | 4.5 | 11.1 | 3 | 7.2 | 19.2 |

The results shown in Tables 4-6 indicate that PHPA choice is not limited to a particular vendor. All combinations of guar gum and PHPA resulted in higher hydration viscosities compared to regular guar gum.

Example 2

Testing of Various Natural Gum/Polyacrylamide Compound

The following compounds were tested to determine their effect on friction reduction: 0.25% solution of MFR-210; 0.125% solution of MFR-210; 0.25% solution of MFR-211 and 0.125% solution of MFR-210 in 7% KCl.

The experiment was conducted as follows.

The flow loop test was conducted at room temperature for 6 minutes. The fluid was flowing at 6 gallons per minute, average pressure in ⅜" outside diameter (OD) flow loop was 60-65 PSI and for ½" OD flow loop was 9-10 PSI.

Samples were tested with fresh water and different brines by measuring its friction reduction percentage though ⅜" and ½" OD pipe using Chandler Flow-Loop system. The water sample was circulated throughout the flow-loop at a rate of 6 gallons per minute.

Once rate was established for a total duration of three minutes, the loop was discharged and refilled with already hydrated solution of the friction reducer products at specific loadings. The solution was circulated to establish the new reduced friction pressures which were used to calculate the friction pressure percentages.

The Flow Loop (FL) pipe diameters were as follows:
¾ (OD) is 8 ft and 0.619 inch as inside diameter (ID);
½ (OD) is 8 ft and 0.404 inch as ID; and
⅜ (OD) is 5 ft and 0.251 inch as ID.

The Flow Loop (FL) test is well known in the industry. Samples were tested with fresh water and different brines by measuring its friction reduction percentage though ⅜" and ½" OD pipe using Chandler Flow-Loop system. The water sample was circulated throughout the flow-loop at a rate of 6 gpm (gallons per minute). Once rate was established for a total duration of three minutes, the loop was discharged and refilled with already hydrated solution of the guar products at specific loadings. The solution was circulated to establish the new reduced friction pressures which were used to calculate the friction pressure percentages.

The results of this experiment are shown in FIG. 1. It shows a better friction reduction performance at a lower concentration (0.125%) of different grades compared to 0.25% of the modified friction reducer (MFR). The experiment also demonstrated that at this concentration, the friction reduction does not change when fresh water is replaced with 7% potassium chloride solution.

Figure 2:
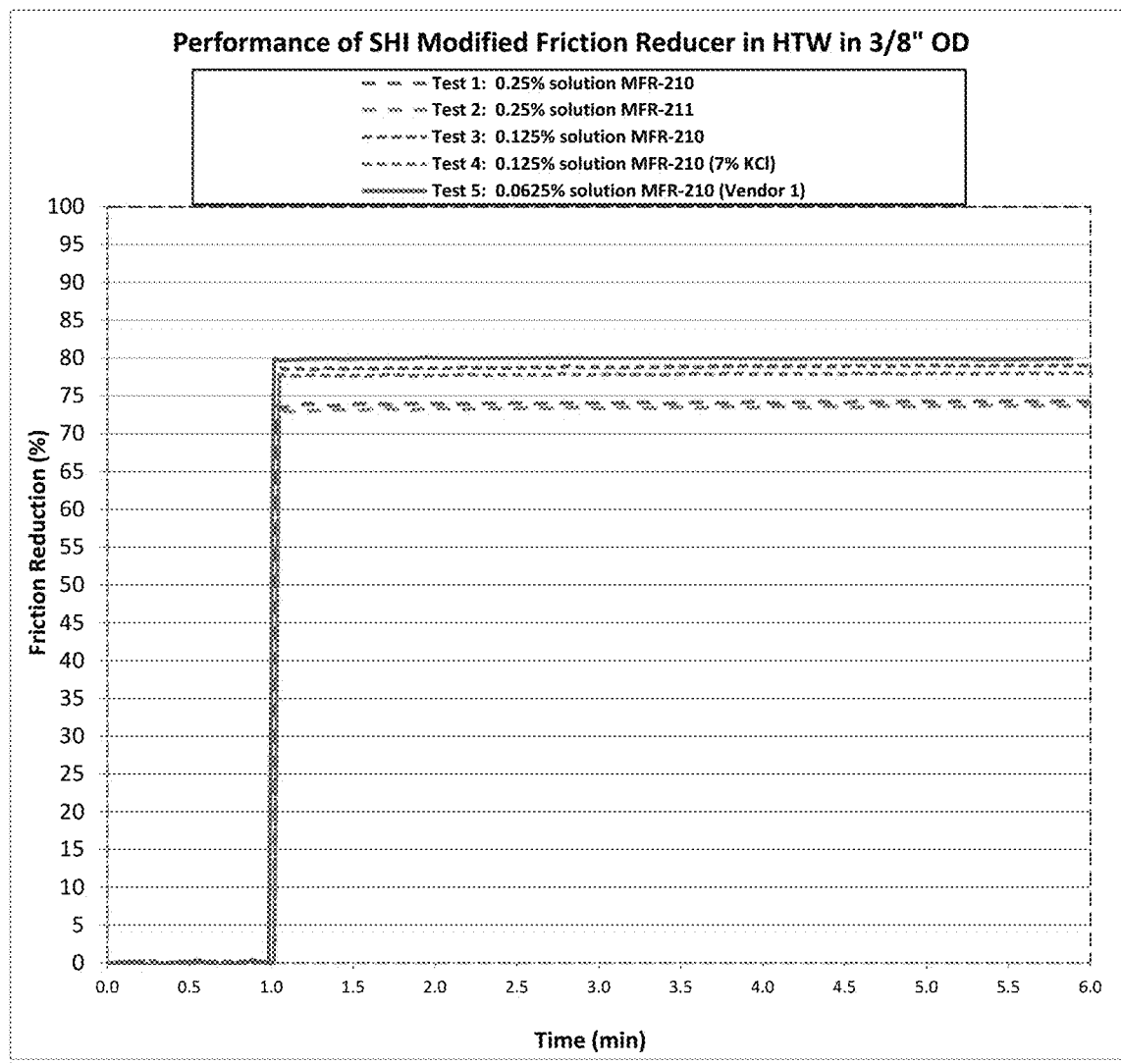
FIG. 2 is another graph demonstrating friction reduction performance of MFR at different concentrations 0.25%, 0.125% and 0.0625% in HTW and 7% KCl solution.

Then, the performance of 0.0625% solution of MFR-210 was evaluated in the same manner. The results of this experiment are shown in FIG. 2. It shows a better friction reduction performance at a lower concentration of 0.0625% solution as compared to the 0.25% solution or the 0.125% solution. The experiment also demonstrated that the friction reduction does not change when fresh water is replaced with 7% potassium chloride.

Figure 3:
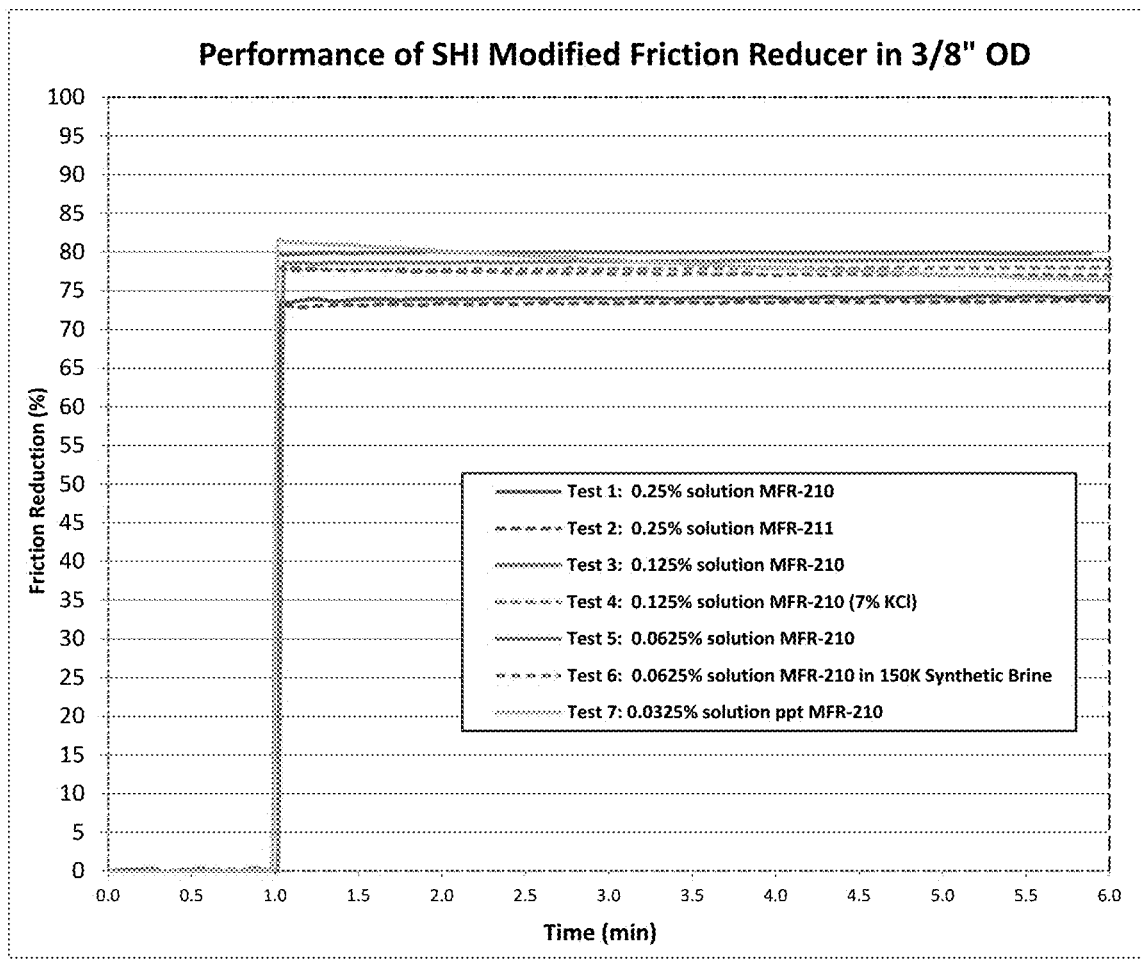
FIG. 3 is a graph demonstrating friction reduction performance of various MFR in HTW, 7% KCl solution, and 150K synthetic brine.

Then, the performance of 0.0625% solution MFR-210 was tested in 150K Synthetic Brine and the performance of 0.0325% solution MFR-210 was tested in HTW. The results of this experiment are shown in FIG. 3. It shows a better friction reduction performance at lower concentration of 0.0625% solution and 0.0325% solution compared to 0.125% and 0.25% solution and the friction reduction does not change when fresh water is replaced with 7% potassium chloride and 150K synthetic brine.

Finally, the following compounds were tested to determine their effect on friction reduction: 0.0625% solution of guar gum in HTW; 0.0625% solution of MFR-210 (vendor 2) in HTW; 0.0625% solution of MFR-210 (vendor 3) in HTW; 0.0625% solution of MFR-210 (vendor 4) in HTW; and 0.0625% solution of MFR-210 in 231K Brine.

150K Brine and 231K Brine refers to total dissolved solids (TDS) brines. TDS brine is a flow back water from gas wells, such as Marcellus shale region brine after hydraulic fracturing.

The compositions of 150K and 231K Brine are listed below:

TABLE 7

| Sample Name | 150 K TDS Brine | 231 K TDS Brine |
|---|---|---|
| Physical Properties (mg/L) | | |
| TDS | 194495.1988 | 220870.0000 |
| Cations (mg/L) | | |
| Boron (B) | 0.000 | 30.000 |
| Barium (Ba$^{+2}$) | 4926.440 | 2.000 |
| Calcium (Ca$^{+2}$) | 21442.504 | 9170.000 |
| Iron (Fe$^{+2}$) | 189.363 | 5.000 |
| Potassium (K$^+$) | 807.656 | 1317.000 |
| Magnesium (Mg$^{+2}$) | 2916.590 | 1460.000 |
| Manganese (Mn$^{+2}$) | 0.000 | 0.000 |
| Sodium (Na$^+$) | 37995.469 | 74400.000 |
| Strontium (Sr$^{+2}$) | 9684.440 | 785.000 |
| Zinc (Zn$^{+2}$) | 0.000 | 0.000 |
| Anions (mg/L) | | |
| Chlorides (Cl$^-$) | 116483.346 | 132500.000 |
| Sulfates (SO$_4^2$) | 0.000 | 515.000 |
| Alkalinity (mg/L) | | |
| Bicarbonates (HCO$_3^-$) | 49.390 | 686.000 |

150K and 231K TDS Brines were provided by Premier Oilfield Group, which also did the Friction Loop test.

Figure 4:
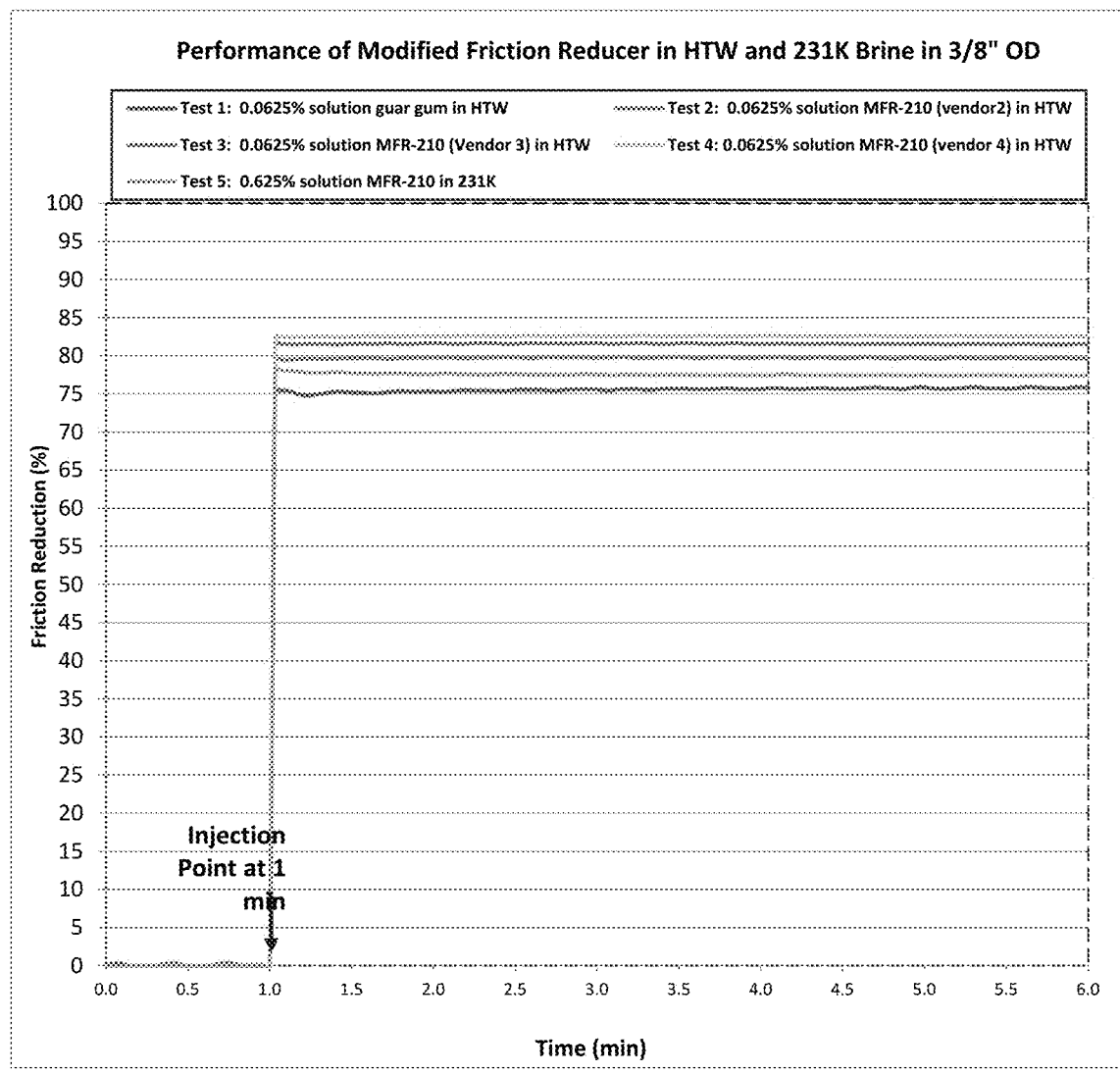
FIG. 4 is a graph demonstrating friction reduction performance of various MFR in HTW and 231K synthetic brine.

The results of this experiment are shown in FIG. 4. It shows premium friction reduction performance at lower concentration of 0.0625% solution of MFR from different vendors and at that same concentration the friction reduction does not change when fresh water is replaced with 231K Brine.

Example 3

Measuring Viscosity of Natural Gum/Polyacrylamide Blends

Viscosity of the friction reducer of the invention was tested using various cross-linking tests. These tests were also done to determine whether the guar gum properties were still intact in the friction reducer of the invention. The tests were done as follows:

All crosslink tests were done at high pressure around 400 PSI and a temperature from 93° C. to 120° C. on Grace M5600 HTHP Viscometer.

Test 1 was done using guar gum 0.375% solution at 120° C. and crosslinking with a delayed borate crosslinker, using 0.25% oxygen scavenger sodium thiosulfate.

The test was done as follows. Guar gum solution was hydrated for 30 minutes at room temperature. Then, 0.25-0.5 ml buffer (45-50% potassium carbonate solution) was added and mixed for 30 seconds. pH was measured to make sure it was above 10. The rest of the chemicals (clay control (1 gpt choline chloride), surfactants (1 gpt non emulsifier) and oxygen scavengers (20 ppt sodium thiosulphate)) in no particular order were added.

At the end, the crosslinker was added and mixed at high shear of 2500 rpm. 50 ml of the crosslink fluid was taken and added to the test cup to run Grace 5600 test.

Figure 5:
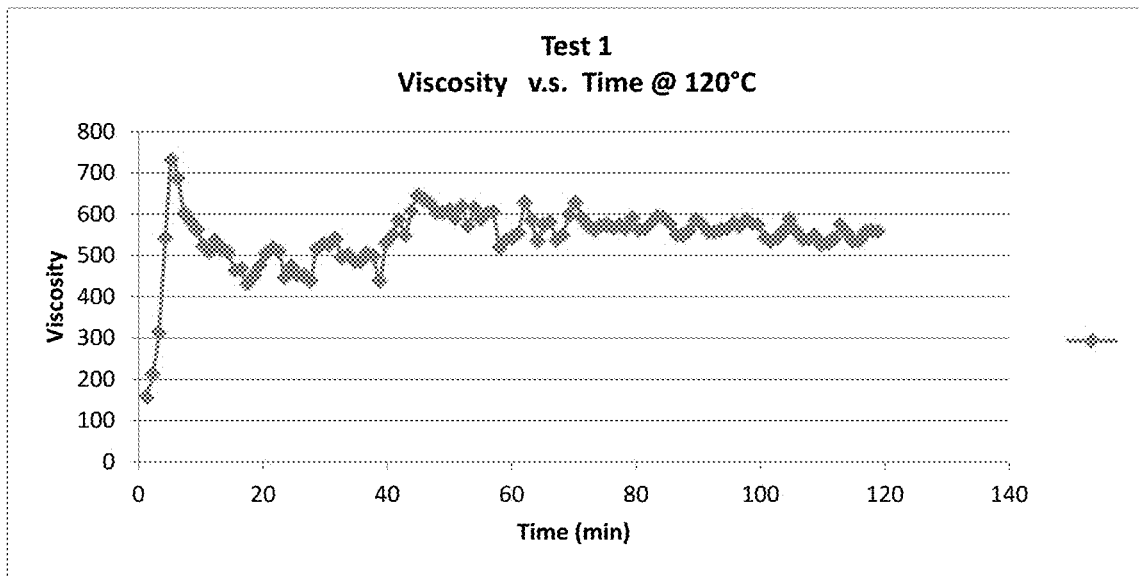
FIG. 5 is a graph of viscosity vs time for guar gum 0.375% solution at 120° C. cross-linked with a delayed borate crosslinker using 0.25% oxygen scavenger.

The results of Test 1 are shown in FIG. 5. It shows guar gum performance at 120° C. temperature and 400 PSI pressure, when crosslinked with a delayed borate crosslinker. The plot shows apparent viscosity, cps @ 100 sec$^{-1}$, versus time in minutes. The fluid was stable for 2 hours with above 400 cps viscosity. The plot shows apparent viscosity, cps @ 100 sec$^{-1}$, versus time in minutes.

Test 2 was done using MFR-210 0.375% solution at 120° C. and crosslinking with a delayed borate crosslinker, using 0.25% oxygen scavenger sodium thiosulfate.

MFR-210 solution was hydrated for 30 minutes at room temperature. Then, 0.25-0.5 ml buffer (45-50% potassium carbonate solution) was added and mixed for 30 seconds. pH was measured to make sure it was above 10. The rest of the chemicals (clay control (1 gallon per thousand gallons (gpt) choline chloride), surfactants (1 gpt non-emulsifier) and oxygen scavengers (20 ppt sodium thiosulphate)) in no particular order were added.

At the end, the crosslinker was added and mixed at high shear of 2500 rpm. 50 ml of the crosslink fluid was taken and added to the test cup to run Grace 5600 test.

Figure 6:
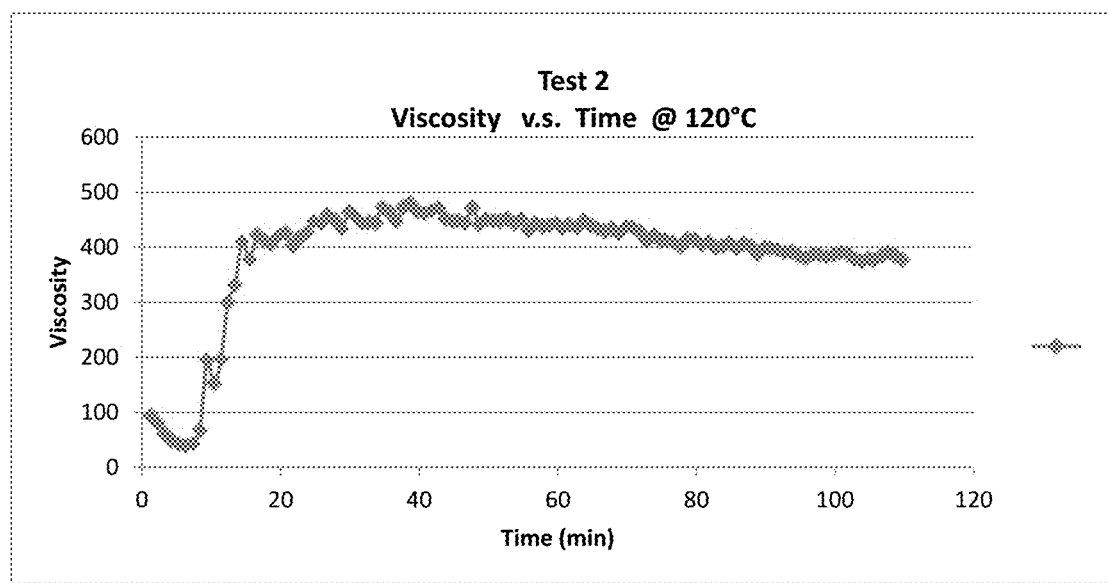
FIG. 6 is a graph of viscosity vs time for MFR-210 0.375% solution at 120° C. cross-linked with a delayed borate crosslinker using 0.25% oxygen scavenger sodium thiosulfate.

The results of Test 2 are shown in FIG. 6. It shows MFR-210 performance at 120° C. temperature and 400 PSI pressure, when crosslinked with a delayed borate crosslinker. The plot shows apparent viscosity, cps @ 100 sec versus time in minutes. The fluid was stable for 2 hours with above 400 cps viscosity. The viscosity was determined on a Grace 5600HTHP Viscometer. This means that the inventive blend did not destroy the guar gum properties.

Test 3 was done using MFR-212 0.375% solution at 120° C. and crosslinking with zirconium based crosslinker, using 0.25% oxygen scavenger sodium thiosulfate.

MFR-212 solution was hydrated for 30 minutes at room temperature. Then, 0.25-0.5 ml buffer (45-50% potassium carbonate solution) was added and mixed for 30 seconds. pH was measured to make sure it was above 10. The rest of the chemicals (clay control (1 gpt choline chloride), surfactants (1 gpt non-emulsifier) and oxygen scavengers (20 ppt sodium thiosulphate)) in no particular order were added.

At the end, the crosslinker was added and mixed at high shear of 2500 rpm. 50 ml of the crosslink fluid was taken and added to the test cup to run Grace 5600 test.

Figure 7:
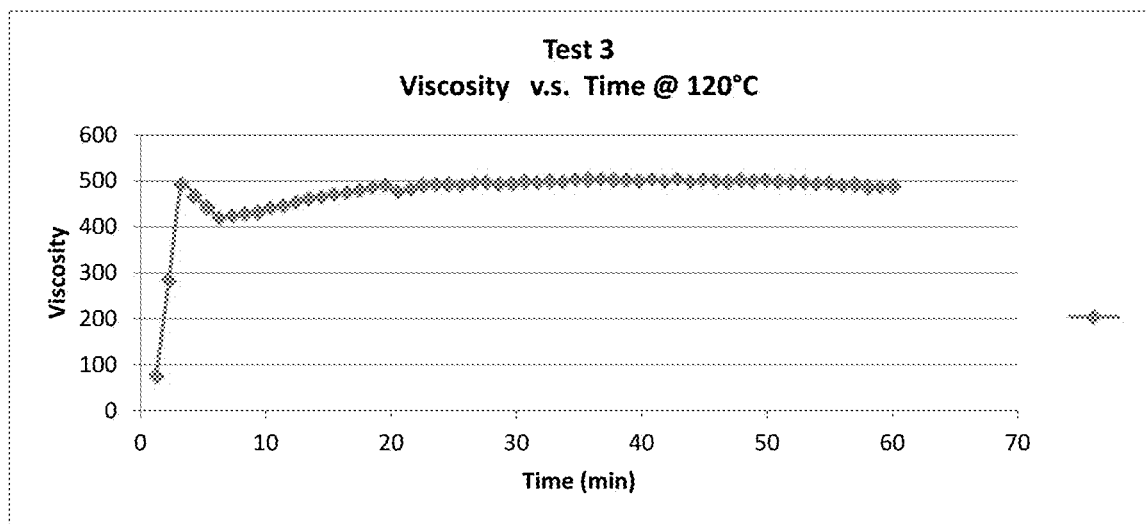
FIG. 7 is a graph of viscosity vs time for MFR-212 0.375% solution at 120° C. cross-linked with zirconium based crosslinker using 0.25% oxygen scavenger.

The results of Test 3 are shown in FIG. 7. It shows MFR-212 performance at 120° C. temperature and 400 PSI pressure, when crosslinked with a zirconium crosslinker. The plot shows apparent viscosity, cps @ 100 sec versus time in minutes. The fluid was stable for 2 hours with above 400 cps viscosity. The viscosity was determined on a Grace 5600HTHP Viscometer. This means that the inventive blend did not destroy the guar gum properties.

Test 4 was done using MFR-210 0.25% solution in 5% KCl at 93° C. and crosslinking with instant boron based crosslinker.

MFR-210 solution was hydrated for 30 minutes in 5% KCl solution at room temperature. Then, 0.25-0.5 ml buffer (45-50% potassium carbonate solution) was added and mixed for 30 seconds. pH was measured to make sure it was above 10. The rest of the chemicals (clay control (1 gpt choline chloride), surfactants (1 gpt non emulsifier) and oxygen scavengers (20 ppt sodium thiosulphate)) in no particular order were added.

At the end crosslinker was added and mixed at high shear of 2500 rpm. 50 ml of the crosslink fluid was taken and added to the test cup to run Grace 5600 test.

Figure 8:
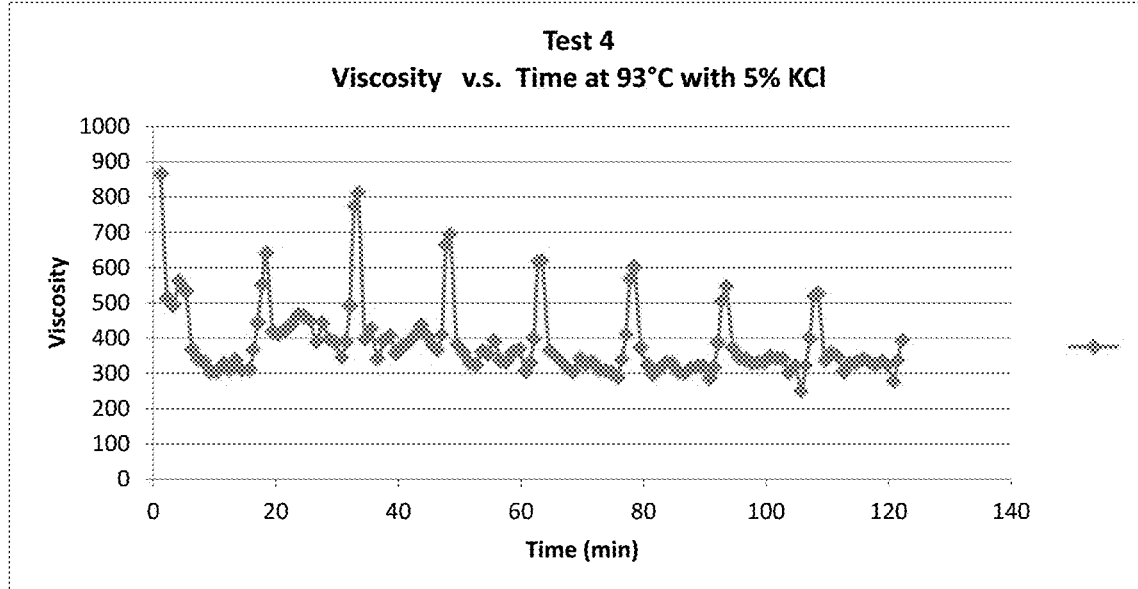
FIG. 8 is a graph of viscosity vs time for MFR-210 0.25% solution in 5% KCl at 120° C. cross-linked with delayed boron based crosslinker.

The results of Test 4 are shown in FIG. 8. FIG. 8 shows MFR-210 in 5% KCl performance at 93° C. temperature and 400 PSI pressure, when crosslinked with a boron crosslinker. The plot shows apparent viscosity, cps @ 100 sec versus time in minutes. The fluid was stable for 2 hours with above 300 cps viscosity. The viscosity was determined on a Grace 5600HTHP Viscometer. This means that the inventive blend did not destroy the guar gum properties.

Example 4

Using Natural Gum/Polyacrylamide Blends to Carry Proppants

A purpose of this experiment was to determine whether the friction reducer of the present invention can be used to carry proppants.

A sand settling test was conducted as follows:

Different combinations of guar to PHPA were tested to make a 0.24% solution to determine the fluids capability to carry sand and how concentration/viscosity changes affected this ability.

The test was performed at a 3$^{rd}$ party lab as follows.

Sand 100 mesh was added at 3 ppa (pounds of proppant added) to 0.125% and 0.24% polymer fluids. It was then observed how sand falls in each solution. The slower the sand accumulates in the cylinder, the better is the sand carrying capacity of the fracturing fluid. A 50 ml cylinder was used.

Another sand settling test was conducted, using different combinations of guar to PHPA for a 20 ppt (0.24%) solution to determine the fluids capability to carry sand and how concentration/viscosity changes affected this ability. Sand (20/40) mesh was added at 10 ppa (pounds of proppant added) to 0.24% polymer fluids. The mixtures were shaken to homogenize the slurry and were then allowed to settle. Sand volumes accumulated at the bottom of the cylinder were measured over time approximately seven minutes. A 50 ml measuring cylinder was used. The results are shown in FIG. 9.

Figure 9:
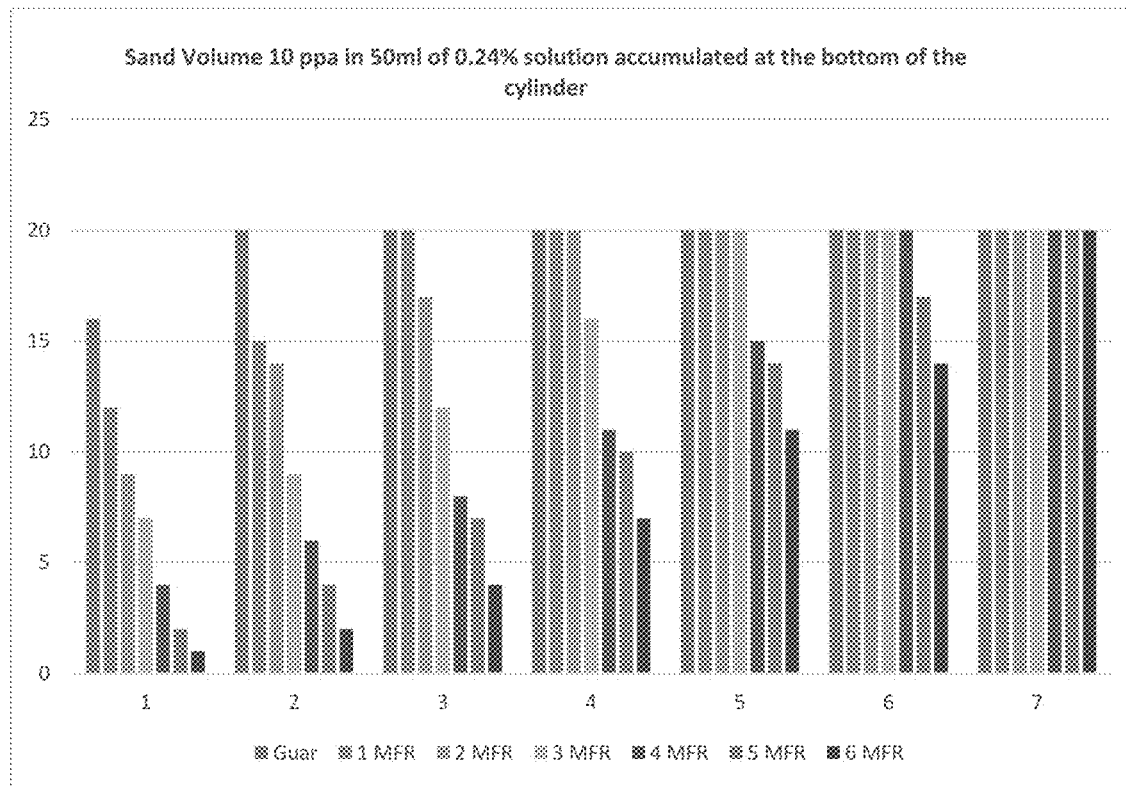
FIG. 9 is a bar graph of sand volume of 0.24% solution of various blends of the invention in a sand settling test.
Figure 10:
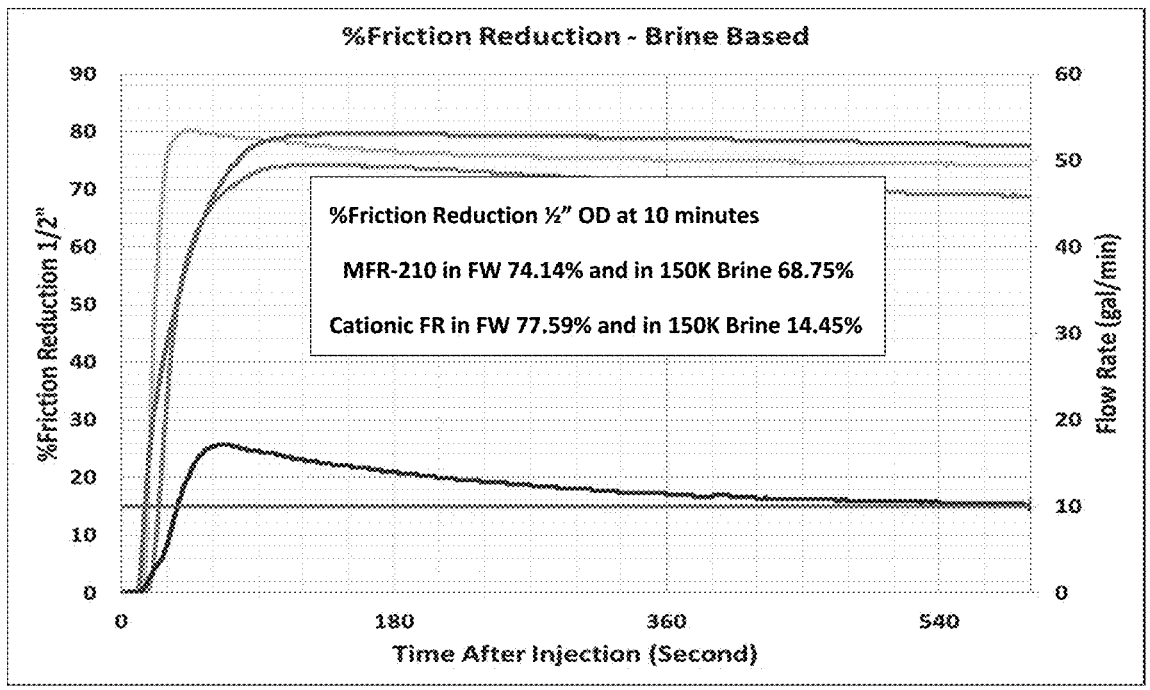
FIG. 10 is a graph demonstrating friction reduction performance of MFR in HTW and 150K synthetic brine compared with a Cationic FR.

As FIG. 9 demonstrates, there was some delay in settling as ratio of guar gum to anionic PHPA increased (0%-30%. By the end of seven minutes, all the sand settled in every cylinder.

From this test, it can be concluded that the higher the ratio of guar gum to anionic PHPA, the better proppant carrying capability at the same concentration of 0.25%.

Example 5

Using Present Invention in a Slurry

The purpose of this experiment was to test whether the present invention is slurriable.

The slurry was prepared as follows. 1.5% of the viscosifying agent was mixed with the 52% of the carrier fluid and mixed at 1000 rpm for 30 minutes on an overhead mixer. After the carrier fluid was viscosified, 0.5% of surfactant was added and mixed for 30 minutes. At the end, 46% of MFR-210 was added and mixed for an hour.

The neat slurry was put on Grace 3600 to measure viscosity which was below 250 cps.

To a 500 ml WARING blender jar, 250 ml DIW was added. Then, 5 ml of MFR-210 slurry was slowly added and mixed at 1100 rpm on Grace M3080 variable speed mixer for 2.5 minutes at room temperature to make a 0.5% hydrated polymer gel.

Hydration viscosities were measured on Grace 3600 at 3 minutes, 10 minutes and 60 minutes. pH of the solution was also measured.

The slurry had the following composition:

TABLE 8

| Component | Weight % | |
|---|---|---|
| Carrier solvent | 52 | |
| Viscosifying agent | 1.5 | |
| Surfactant | 0.5 | |
| MFR 210 | 46 | |
| Neat slurry viscosity cps | <300 cpss | |
| Hydrate gel 5 mls/500 gms DIW with 2% KCl at 2000 rpm mix for 2 minutes | Guar Gum viscosities (ops) | MFR Viscosities (cps) |
| 3 min viscosity | 36-40 | 41 |
| 10 min viscosity | 40-44 | 44 |
| 60 min viscosity | 42-46 | 47 |
| pH | 7-8 | 7.52 |

Example 6

Retain Conductivity Analysis

The purpose of this experiment was to determine retained conductivity of Hyslic 9901 at 180° F.

A third party conducted the testing. The samples were labeled Baseline (100 Mesh Northern White), 100 Mesh Northern White+FR w/o Breaker, 100 Mesh Northern White+FR with Breaker, and 100 Mesh Northern White+Hyslic 3 with Breaker. Each sample was tested for conductivity and permeability.

Long-term fracture conductivity testing was performed on the samples at a closure stress of 2000 psi. The test was performed at a temperature of 180° F. using a 2% KCl solution with the cells loaded at 2 lb/ft2 between Ohio sandstone cores.

American Petroleum Institute, API Recommended Practice 19D "Procedures for measuring the long-term conductivity of proppants" was used to obtain baseline values. Standard baseline testing is 50 hours at each stress level starting at 2000 psi.

Samples were as follows:
Baseline (100 Mesh Northern White)
100 Mesh Northern White+FR w/o Breaker
100 Mesh Northern White+FR with Breaker
100 Mesh Northern White+Hyslic 3 with Breaker The Regain Conductivity Test examines the effects of fracturing fluids on the proppant pack while under stress and temperature.

1. A pre-sieve analysis is performed using the ISO 13503-2:2006/API RP-19C "Measurements of proppants used in hydraulic fracturing and gravel pack operations." Standard US Mesh screens were used to separate the samples by size. Based on the recommended sieve stack for a given proppant size, not more than 0.1% should be greater than the first specified sieve and not more than 1% should be retained in the pan. There should be at least 90% retained between the specified screens.

2. Zero width of the proppant pack is determined by assembling the conductivity cell with shims and without the proppant sample. The distance between the width bars that are attached to each end of the conductivity cell are measured at each of the four corners and recorded. The cells are then disassembled and reassembled with the proppant samples. The measurements are made again at the beginning and ending of each stress period. Width is determined by subtracting the average of the zero from the average of each of the width values measured at each stress loading.

3. Conductivity cells are loaded with 100 Mesh Northern White proppant at 2.0 lb./ft2 loading between Ohio sandstone cores. One cell will remain the baseline for the test, while the other three cells will have a fracturing fluid injected into each. The stack is then loaded onto the press and the closure stress is increased to 500 psi and vacuum saturated to remove any air from the system.

4. A 1000 psi closure stress is applied across a test unit for 12-24 hours at temperature to allow the proppant sample bed to reach a semi-steady state condition.

5. The 25 pore volumes (500 ml) of fluid is injected into the proppant pack with the leak-off ports open at 1000 psi, allowing the fluid to concentrate on the Ohio sandstone cores. A graduated cylinder is used to collect the leak off from the cell. The fluid rate volume for the cell is measured and recorded. The leak off is measured at 1, 2, 4, 9, 16, 25, 36, and 49 minutes. This process is repeated for the other two conductivity cells.

6. The cells are shut-in for 24 hours and the closure stress is increased to 2000 psi. The fluid is allowed to break with a 400-psi back pressure maintained with 2% KCl.

7. After the shut-in period is complete, the cells are opened, and fluid flow begins at 0.5 ml/min. During this period the maximum differential pressure to initiate flow is measured and recorded. The fluid rate is then returned to normal for the duration of the test.

8. As the fluid is forced through the proppant bed, the pack width, differential pressure, temperature, and flow rates are measured and recorded at each stress. Proppant pack permeability and conductivity are then calculated using the Darcy equation. This serves as the 0 hour Regain reading. Readings after the 0 hour are taken at the 24 hour mark and the 50 hour mark. Percent regain is calculated by comparing the baseline permeability with the fluid sample permeability.

9. Multiple flow rates are used to verify the performance of the transducers, and to determine Darcy flow regime at each stress; an average of the data at these flow rates is reported. The test fluid is 2% KCl filtered to 3 μm absolute. The initial conductivity, permeability and width is measured and compared to the final conductivity, permeability, and width after each stress period. Stress is applied and maintained using an Isco 260D. Stress is applied at 100 psi/minute 10. Pictures are taken of the proppant sample between the cores and of the proppant sample on top of the cores after the cores have been separated.

11. A post-sieve analysis is performed using the procedure found in ISO 13503-2:2006/API RP-19C "Measurements of proppants used in hydraulic fracturing and gravel pack operations". Standard US mesh screens are used to separate the samples by size. Based on the recommended sieve stack for a given proppant size, not more than 0.1% should be greater than the first specified sieve and not more than 1% should be retained in the pan. There should be at least 90% retained between the specified screens for an ISO graded proppant.

Calculations

Conductivity: $kW_f = 26.78 \, \mu Q/(\Delta P)$ ***
Permeability: $k = 321.4 \, \mu Q/[(\Delta P)W_f]$ *** k is the proppant pack permeability, expressed in Darcy $kW_f$ is the proppant pack conductivity, expressed in millidarcy-feet μ is the viscosity of the test liquid at test temperature, expressed in centipoises Q is the flow rate, expressed in cubic centimeters per minute ΔP is the differential pressure, expressed in psi $W_f$ is proppant pack width, expressed in inches The results of this experiment were as follows:

Guar Gum VS Hyslic 9901

10 ppt guar gum Linear gel with 1.0 ppt AP Regain 55%

10 ppt guar gum XL gel with 1.0 ppt AP Regain 50%

10 ppt Hyslic 9900 Linear gel with 1.0 ppt AP Regain 80%

10 ppt Hyslic 3000 Linear gel with 1.0 ppt AP Regain 82%

10 ppt Hyslic 9901 Linear gel with 1.0 ppt AP Regain 89%

Example 7

Retained Organic Nitrogen Analysis

The purpose of this experiment was to determine the content of total organic nitrogen in FR of the invention.

The levels of total organic nitrogen were measured by a third party according to the industry-accepted protocols.

The results of this experiment were as follows:

| Analyte Mg/L | Anionic FR1 | Anionic FR2 | Hyslic 9901 | Hyslic 9900 | Hyslic 3000 |
|---|---|---|---|---|---|
| Ammonia | 6.95 | 3.68 | 2.36 | 1.05 | 0.233 |
| Nitrogen, Kjeldahl | 44 | 36.6 | 7.36 | 7.04 | 5.02 |
| Nitrogen, Organic | 37.1 | 32.9 | 6.31 | 5.99 | 4.79 |

What is claimed is:

1. A friction reducer comprising guar gum and a partially hydrolyzed polyacrylamide (PHPA) having a molecular weight between 300,000 and 30,000,000, wherein the guar gum has an average particle size of 150 μm or less and further wherein the friction reducer is void of a crosslinking agent.

2. The friction reducer of claim 1, wherein the ratio of the guar gum and the PHPA is from about 5:1 to about 1:0.01.

3. The friction reducer of claim 1,
   wherein at least one of the following is true:
   (a) the friction reducer is an iron control friction reducer;
   (b) the residual total organic nitrogen in the friction reducer is below 7%; or
   (c) the regain permeability of the friction reducer is above 80%.

4. A well treatment fluid comprising an aqueous base fluid and the friction reducer of claim 1.

5. The well treatment fluid of claim 4, wherein the concentration of the friction reducer is about 0.1% or less by weight of the aqueous base fluid.

6. The well treatment fluid of claim 4, wherein the aqueous base fluid is a brine comprising one or more dissolved inorganic salts in a total concentration between 0.1 and 20 weight percent of the total weight of the aqueous base fluid.

7. The well treatment fluid of claim 6, wherein the one or more inorganic salt comprises one or more monovalent or divalent or trivalent cations or one or more monovalent or divalent anions.

8. The well treatment fluid of claim 6, where the cation of the one or more inorganic salt is selected from the group consisting of iron, boron, calcium, magnesium, iron, strontium, sodium and potassium and the anion is selected from the group consisting of chlorides, bicarbonates, sulfates, sulfides, carbonate and oxides.

9. The well treatment fluid of claim 4, wherein the aqueous base fluid comprises fresh fracturing fluid, recycled fracturing fluid, flowback fracturing fluid or back-produced fracturing fluid, or combinations thereof.

10. The friction reducer of claim 1 comprising a blend of the guar gum and the partially hydrolyzed polyacrylamide (PHPA).

11. The friction reducer of claim 1 comprising a reaction product of the guar gum and the partially hydrolyzed polyacrylamide (PHPA).

12. The friction reducer of claim 1 comprising the partially hydrolyzed polyacrylamide grafted onto the guar gum.

13. The well treatment fluid of claim 4, wherein the viscosity of the aqueous fluid is between 1 cp to 10 cps at ambient temperature.

14. The friction reducer of claim 1, wherein the average particle size of the PHPA is 150 μm or less.

15. A friction reducer comprising a partially hydrolyzed polyacrylamide (PHPA) having a molecular weight between 300,000 and 30,000,000 and guar gum, wherein both the PHPA and guar gum have an average particle size less than or equal to 150 μm.

16. The friction reducer of claim 15 comprising a blend of the partially hydrolyzed polyacrylamide and guar gum.

17. A well treatment fluid comprising the friction reducer of claim 15, wherein the viscosity of the fluid is from 1 to 10 cps at ambient temperature.

18. A friction reducer comprising a blend of a partially hydrolyzed polyacrylamide (PHPA) having a molecular weight between 300,000 and 30,000,000 and a galactomannan gum, wherein the galactomannan gum has an average particle size less than or equal to 150 μm.

19. The friction reducer of claim 18, wherein the galactomannan gum is guar gum.

20. A well treatment fluid comprising the friction reducer of claim 18, wherein the viscosity of the fluid is from 1 to 10 cps at ambient temperature.

* * * * *